H. S. FOLGER & C. L. REDFIELD.
SELF INKING HAND STAMP.
APPLICATION FILED OCT. 7, 1914.
1,172,237.
Patented Feb. 15, 1916.
2 SHEETS—SHEET 2.
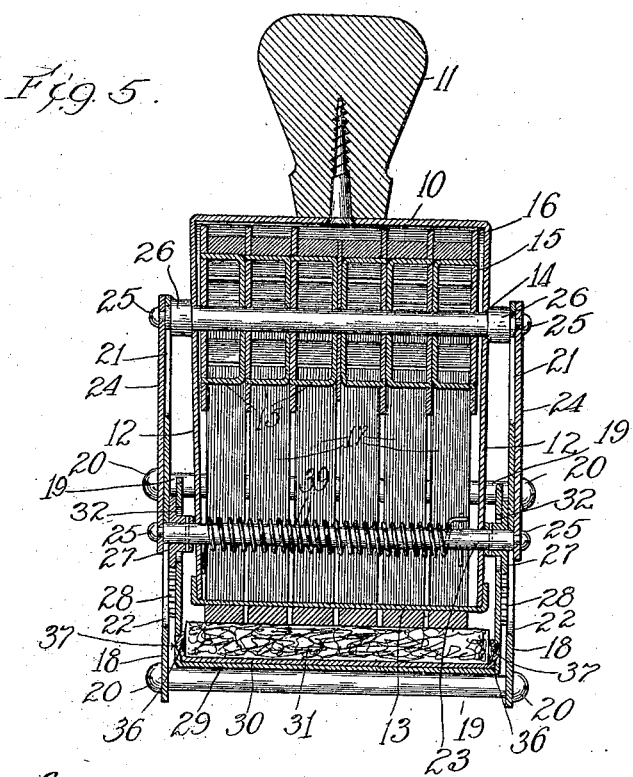
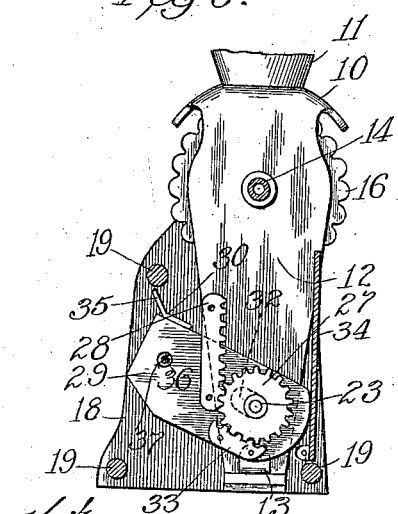
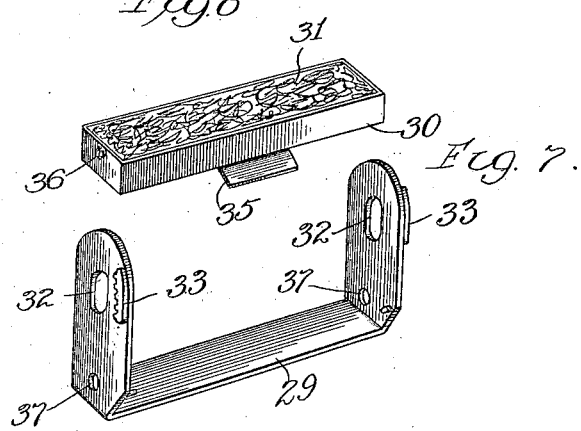
Inventors:
Harry S. Folger
Casper L. Redfield
By Casper L. Redfield Atty.

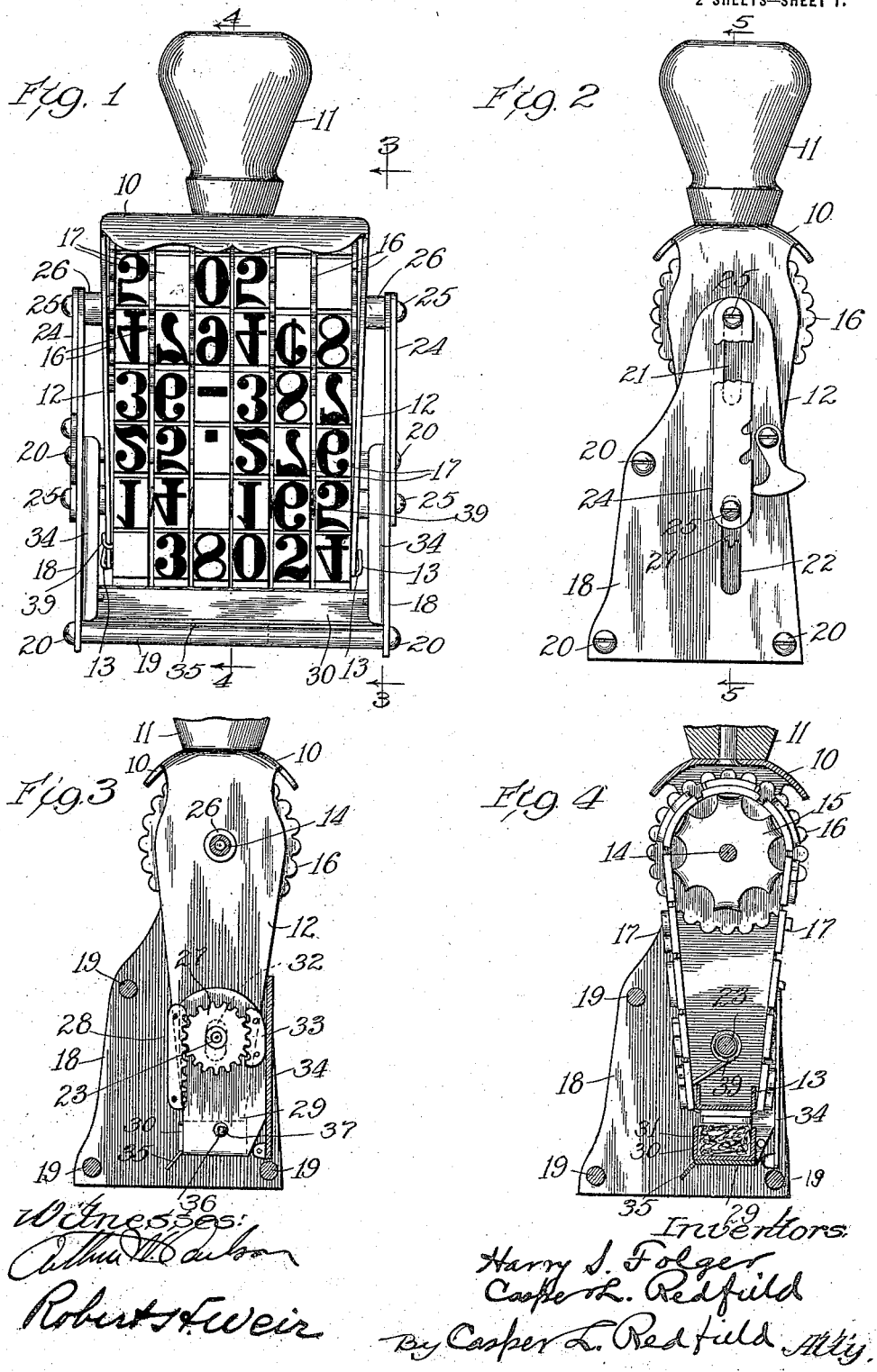

UNITED STATES PATENT OFFICE.

HARRY S. FOLGER AND CASPER L. REDFIELD, OF CHICAGO, ILLINOIS; SAID REDFIELD ASSIGNOR TO SAID FOLGER.

SELF-INKING HAND-STAMP.

1,172,237.  Specification of Letters Patent.  Patented Feb. 15, 1916.

Application filed October 7, 1914. Serial No. 865,440.

*To all whom it may concern:*

Be it known that we, HARRY S. FOLGER and CASPER L. REDFIELD, citizens of the United States of America, and residents of Chicago, county of Cook, and State of Illinois, have invented certain new and useful Improvements in Self-Inking Hand-Stamps, of which the following is a specification.

Our invention relates to self inking hand stamps and has for its object improvements in the construction and operation of such stamps.

In the accompanying drawings Figure 1 is a front elevation; Fig. 2 is a side elevation; Fig. 3 is a section on line 3—3 of Fig. 1; Fig. 4 is a section on line 4—4 of Fig. 1; Fig. 5 is a section on line 5—5 of Fig. 2; Fig. 6 is a section similar to Fig. 3 but with the stamp moved to its printing position; Fig. 7 is a perspective view of the swinging pad-box supporting frame; and Fig. 8 is a perspective view of the pad box.

The sliding stamp holding frame 10 consists of a bail shaped piece of sheet metal having a handle 11 at the center of the upper bridge. The lower ends of the legs 12 of the frame 10 are connected together by a bridge 13. Through the upper portion of the legs 12 is a shaft 14 on which are mounted a series of loose band wheels 15 having flanges 16 by which they may be moved independently. Mounted on the wheels 15 and the bridge 13 are type bands 17 which may be adjusted manually by turning the flanges 16.

The stationary frame (which may be moved manually from place to place but which is stationary during the printing action) consists of two similar flat plates 18 connected together by tie bolts 19 and screws 20. The plates 18 are provided with upper slots 21 and lower slots 22. The ends of the shaft 14 project into and are guided in the slots 21. Extending through the lower parts of the legs 12 of frame 10 is a second shaft 23 having its ends guided in the slot 22. Links 24 connected to the ends of the shafts 14 and 23 by means of screws 25 serves to prevent said shafts from moving axially with respect to the stationary frame. Collars 26 on the shaft 14 between the sliding and stationary frames prevent lateral displacement of the two with respect to each other.

Secured on the outer ends of the shaft 23, and adjacent to the inner faces of the plates 18, are gears 27 which engage stationary racks 28 secured to the plate 18. A spring 39 on the shaft 23 acts to turn the gears 27 so as to elevate the stamp frame 10 in the stationary frame 18.

Suspended on the shaft 23, or on the hubs of gears 27 secured to said shaft, is a frame 29 for supporting a box 30 containing an ink pad 31. The point of engagement between the hubs of gears 27 and the pad frame 29 is represented by slots 32 in the vertical arms of the frame 29. These slots 32 permit the frame 29 to move vertically with respect to the axis of the shaft 23, and consequently with respect to the type bands 17 carried in the same frame that carries the shaft 23.

Secured to the outer faces of the upright arms of frame 29, and adjacent to the slots 32, are short racks 33 which engage gears 27 (Fig. 3) on the sides opposite racks 28. It will be evident that as the spring 39 turns the gears 27 in a contraclockwise direction, as shown in Fig. 3, to raise the stamp frame 10 in the stationary frame 18, the racks 33 and pad frame 29 will move upward twice as fast as the stamp frame moves, and that the slots 32 will permit a limited amount of such upward movement. The thickness of the pad 31, supported in the box 30 and frame 29, is so related to the other parts that this upward movement of the frame 29 is limited by engagement between the pad face and the type bands 17, and not by engagement between the lower ends of the slots 32 and the hubs of gears 27. If, with the parts in this upper position, the stamp frame 10 be moved downward manually by applying the hand to the handle 11, the gears 27 will also be moved downward and will be rotated by reason of their engagement with the stationary racks 28. This simultaneous downward and rotary movement of the gears 27 will force racks 33, frame 29 and pad 31 to move downward twice as fast as the stamp frame 10 and bands 17 move until such movement is arrested by engagement between the upper ends of the slots 32 and the hubs of gears 27. The consequence of this action is that when the stamp is manually moved downward in the stationary frame 18, the pad 31 moves downward still more rapidly to clear it from contact with the type bands. When this downward movement of the pad with respect to the stamp is stopped by reason of the upper ends of the slots 32 engaging the hubs of gears 27, the said gears and racks 33 become locked together, and thereafter the pad frame and pad swing rearwardly upon the shaft 23 as a pivot. Fig. 6 shows the position of the pad frame 29 at the time this swinging movement is stopped by reason of the stamp arriving at the printing point.

Secured to the inner faces of the plates forming the stationary frame 18 are guides 34 which engage the forward edges of the pad frame 29 when said frame is in its upper position as shown in Fig. 3. As the stamp rises in the stationary frame, the forward return swing of the stamp frame 29 is stopped by engagement with the guides 34, and thereafter the pad moves upward twice as fast as the stamp until the entire upward movement is arrested by engagement between the pad and the stamp.

When the stamp moves downward in the stationary frame, the pad moves straight downward at a greater speed until the pad is clear of the stamp. The clearance in the upper parts of the slots 32 is made just enough to have the edges of the pad clear the edges of the type faces when the pad swings to the rear. To prevent dirt or incidental friction in the downward movement of the pad frame 29 from causing this frame to swing to the rear before the desired clearance between pad and type is obtained, the guides 34 are used to maintain this straight downward movement of pad frame 29 until the ends of the slots 32 engage the hubs of gears 27. This is accomplished by making the upper ends of the vertical legs of frame 29 arcs of circles drawn from the same centers as the upper arcs of the slots 32. This permits the free swinging of the frame 29 when the slots are seated on the hubs of the gears, but prevents such swinging until they are so seated. The fitting for this need not be very accurate as normally the pad frame will move straight downward without such guiding.

The pad box 30 is provided with a lip or wing 35 for convenience in removing it from the frame 29. The box also has small buttons 36 pressed outward on its ends, which buttons are adapted to fit into depressions 37 formed in the legs of the frame 29. The buttons and depressions serve to hold the pad box 30 in the frame 29, while at the same time permitting the box to be removed by a moderate force manually applied.

What we claim is:—

1. A stamp, a frame in which the stamp is vertically movable, a pad pivoted to the stamp and engaging the lower face thereof, and means by which upon manually depressing the stamp the pad will be automatically moved downward to clear the stamp face and then will be swung rearwardly out of the path of the descending stamp.

2. A stamp, a frame within which the stamp is vertically movable, an ink pad pivoted to the stamp and engaging the lower face thereof, and connections by which upon manually depressing the stamp the pad will be moved first downwardly more rapidly than the stamp to clear the stamp face and then will be moved rearwardly out of the path of the descending stamp.

3. A stamp, a frame within which the stamp is movable, an ink pad engaging the face of the stamp, a rack secured to the frame, a second rack secured to the pad, and a gear secured to the stamp and engaging said racks, said racks and gear serving to move the pad with respect to the stamp when the stamp is moved in the frame.

4. A frame, a stamp movable in the frame, a pad suspended on the stamp and arranged to engage the stamp face when said stamp is elevated in the frame, and gear and rack connections for removing the pad from the stamp face when said stamp is depressed in the frame.

5. A frame, a stamp movable in the frame, a pad pivoted to the stamp and movable to engagement with the stamp face, and means by which upon depressing the stamp the pad will be first removed from the stamp face and then swung upon its pivot.

6. A frame, a stamp movable in the frame, an ink pad engaging the printing face of the stamp and having a sliding and pivotal connection to the stamp, and means by which upon depressing said stamp the said pad will first slide and then move pivotally with respect to said stamp.

7. A frame, a stamp movable in the frame, an ink pad engaging the face of the stamp, a gear connected to the stamp, a rack connected to the pad, and means by which said gear is locked to said rack during part of the movement of the stamp in the frame and unlocked during another part of such movement.

8. A stationary frame, a stamp movable in the frame, an ink pad, a pad holding frame having a slotted connection to the stamp, a gear on the stamp, and a rack on the pad holding frame, said gear, said rack and said slotted connection being arranged to coöperate in moving the pad to and from the stamp when said stamp is reciprocated in the stationary frame.

9. The combination with a hand stamp, and an ink pad therefor, of a pad holding frame pivoted to and arranged to slide with respect to said stamp, and guides for guiding said frame during the sliding portion of its movement.

10. The combination with a hand stamp, and an ink pad therefor, and a frame within which the stamp reciprocates, of gears connected to the sides of the stamp, racks secured to the frame and engaged by said gears, other gears secured to the pad and also in engagement with the gears, and means by which upon a reciprocation of the stamp in the frame said gears will turn with respect to the racks on the frame during the whole of the reciprocation but will turn with respect to the racks on the pad during only part of such reciprocation.

11. In a self-inking hand stamp, a stamp, a pad engaging the face of the stamp, a bail-shaped pad-holding frame pivoted to the stamp, and means for moving said frame so as to move the pad from and to the stamp face.

12. In a self-inking hand stamp, a stamp body, a bail-shaped frame pivoted to the stamp, a removable pad supported in the frame, and means for moving said frame so as to move said pad to and from the face of the stamp.

13. In a self-inking hand stamp, a stamp body, a shaft extending through the stamp body above the stamp face, a swinging frame pivoted upon the ends of the shaft, and a removable pad supported in the frame and engaging the stamp face.

14. In a self-inking hand stamp, a stamp body, pivoting points on the opposite sides of the stamp above the printing face thereof, a frame mounted upon said pivoting points, and a removable pad-holding box mounted in said frame.

Signed at Chicago, Illinois this 5th day of October, 1914.

HARRY S. FOLGER.
CASPER L. REDFIELD.

Witnesses:
WALTER H. REDFIELD,
JAMES C. REDFIELD.